UNITED STATES PATENT OFFICE.

EDWARD GREENE, OF NEW YORK, N. Y.

IMPROVEMENT IN THE MANUFACTURE OF GUNPOWDER.

Specification forming part of Letters Patent No. 160,053, dated February 23, 1875; application filed January 25, 1875.

*To all whom it may concern:*

Be it known that I, EDWARD GREENE, of the city of New York, in the county and State of New York, have invented an Improvement in the Manufacture of Gunpowder, of which the following is a specification:

In the manufacture of gunpowder, as commonly practiced, it is usual to grind the saltpeter or nitrate of soda dry in a mill, and then mix it with the other ingredients in a pulverized state. Some manufacturers, many years ago, practiced what was thought to be an improvement upon the above-named usual method of treating the saltpeter, which was to dissolve it in hot water and add the hot solution to the pulverized charcoal and brimstone. But in a saturated solution of saltpeter, and especially of the nitrate of soda, at any temperature conveniently obtained or maintained, there is always an excess of water beyond what is needed to moisten the other ingredients of gunpowder when the latter are in the usual proportions, and the mixture is thereby rendered too moist for proper action under the incorporating-wheels in ordinary use.

To obviate these difficulties experienced in dissolving the saltpeter or nitrate of soda, a circular trough of large dimensions has been used, in which the incorporating-wheels traveled, thus spreading the composition over a large surface, in order to effect a speedy evaporation of the surplus moisture and bring the composition to a proper consistence or state of dryness for effectual incorporation. But this method of treating the composition not only facilitates evaporation, but necessarily quickly reduces the temperature of the mass, and the evaporation and reduction of temperture together, occurring, as they do, while the mass is comparatively in a state of rest, (all parts being undisturbed between the intermittent action upon them of the revolving wheels,) causes necessarily a rapid recrystallization of the saltpeter, whereby large crystals are formed before the incorporation is complete, thus defeating the very object of dissolving the saltpeter, namely, a more minute division of its particles than can be effected by grinding, in order to secure the utmost possible intermingling of the ingredients of the powder.

More recently saltpeter has been dissolved in a covered vessel by a jet of steam introduced into the vessel, and a preliminary mixing of the saltpeter thus dissolved with the other ingredients, also in a heated vessel, has produced a composition that has required but little evaporation before being of sufficient consistence to act properly under the runners or incorporating-wheels.

But, while saltpeter may be thus treated with some degree of success, such treatment is not practicable with nitrate of soda. This material requires a larger proportion of water than does saltpeter for its solution, an the excess of water in the gunpowder con.position made with saturated solution of the soda is so great that the mass, though prepared and mixed as described, in heated vessels, is still too moist for proper conduct under the incorporating-wheels.

It is the object of my invention to obviate the difficulties referred to, that are encountered when employing, in the manufacture of gunpowder or blasting-powder, a solution of saltpeter, and especially a solution of the nitrate of soda, in place of using said salts dry, in a pulverized state, by performing the operation of mixing a heated solution of either of said salts with the other ingredients of powder in a vacuum, or partial vacuum, whereby a rapid evaporation of the surplus moisture is effected, at the same time that the composition is kept in active agitation, and the requisite heat of the mass is maintained, thus causing the recrystallization of the salt, which occurs as the water evaporates, to take place in crystals or particles more minute than it is practicable to produce by mechanical trituration, and thereby accomplishing a more complete and perfect incorporation of the salt with the other ingredients than can be effected by any process now practiced.

In practicing my improved method I make a saturated solution of saltpeter or nitrate of soda, preferably at a temperature not much, if any, below the boiling-point of the water, as the nearer the temperature is to the boiling-point, the less is the quantity of water required. Still, the temperature at the outset should not be greater than can be conveniently maintained during the subsequent steps of the process. This heated solution, together with the other ingredients of powder equally heated, I put into a closed air-tight vessel, which is heated by steam or hot air surrounding it in a jacketed space, or by any other convenient means, so that the high temperature of the mass may be maintained. This vessel is provided with a stirring apparatus, which may be a shaft passing into the vessel through a stuffing-box in the cover, and provided with arms to revolve or reciprocate within the vessel. With this vessel is connected an air or vacuum pump, whereby the contained air and the vapor formed by the evaporation of the water in the vessel may, as completely as practicable, be drawn out, and thus a partial vacuum in the vessel is maintained during the operation of stirring. Motion is communicated to the stirrer by any convenient means, and the pump is at the same time put in motion, the requisite heat being secured by steam or hot air introduced into the jacketed space around the vessel. Under these conditions, concurrent operations of the stirrer and an air-pump are continued until the ingredients of the powder are thoroughly mixed, which is quickly accomplished, when it will be found that the mass will have acquired the right consistence for proper conduct under the wheels of the incorporating-mill, that the saltpeter or nitrate of soda, as the case may be, will have resumed its solid state in exceedingly minute crystals or particles, and that a most intimate and complete incorporation of the ingredients will have been effected. Indeed, so complete is the intermixture of the constituents of the powder that the operation of the runners or incorporating-wheels may, for powder of a certain value and strength, be dispensed with altogether, and the composition removed directly from the stirrers described to the press; and for higher grades of powder, requiring the action of the runners, my preliminary operation of stirring the composition *in vacuo* will greatly shorten the time required for incorporating under the runners.

By my invention the labor of grinding the saltpeter or soda is saved, the work of the incorporating-mill is reduced, the entire operation of making the powder is shortened and cheapened, and the quality of the powder is improved.

I have above described an apparatus by which my improved process may be practiced, but I do not intend to limit myself to the use of such special apparatus, nor do I intend, in this specification, to claim the apparatus described; reserving such claim for another and separate application for a patent therefor, which it is my purpose to make.

What I here claim as my invention, and desire to secure by Letters Patent, is—

In the manufacture of gunpowder, the process herein described of incorporating together the ingredients, consisting in dissolving the saltpeter or nitrate of soda in hot water, and mixing the other ingredients with the heated solution, the heat being maintained during the operation in a complete or partial vacuum, substantially as and for the purpose set forth.

Witness my hand this 7th day of January, 1875.

EDWARD GREENE.

Witnesses:
W. H. SMITH,
A. W. HIGGINS.